United States Patent [19]
Chan et al.

[11] Patent Number: 6,038,624
[45] Date of Patent: Mar. 14, 2000

[54] REAL-TIME HARDWARE MASTER/SLAVE RE-INITIALIZATION

[75] Inventors: Fu Chan, Spring; Kamran Khederzadeh, Houston; William C. Hallowell, Spring, all of Tex.

[73] Assignee: Compaq Computer Corp, Houston, Tex.

[21] Appl. No.: 09/028,711

[22] Filed: Feb. 24, 1998

[51] Int. Cl.[7] .................................................. G06F 13/00
[52] U.S. Cl. .............................. 710/103; 710/104; 710/10
[58] Field of Search ..................................... 710/103, 104, 710/129, 8, 10

[56] References Cited

U.S. PATENT DOCUMENTS

| | | | |
|---|---|---|---|
| 5,761,460 | 6/1998 | Santos et al. ............................ | 710/129 |
| 5,768,541 | 6/1998 | Pan-Ratzlaff ................................ | 710/8 |
| 5,852,743 | 12/1998 | Yeh ........................................... | 710/18 |

OTHER PUBLICATIONS

"Plug and Play BIOS Specification", Compaq Computer Corporation, Phoenix Technologies LTD., Intel Corporation, Version 1.0A, May 5, 1994, 55 pages.

"Device Bay", Device Bay Interface Specification, Compaq, Intel, Microsoft, Revision .83 Dec. 23, 1997, 204 pages.

*Primary Examiner*—Glenn A. Auve
*Attorney, Agent, or Firm*—Matthew S. Anderson

[57] ABSTRACT

A computer system in which various system peripherals are automatically re-initialized after being hot-swapped. The reinitialization includes accommodation of any required master/slave relationships between the peripherals.

22 Claims, 2 Drawing Sheets

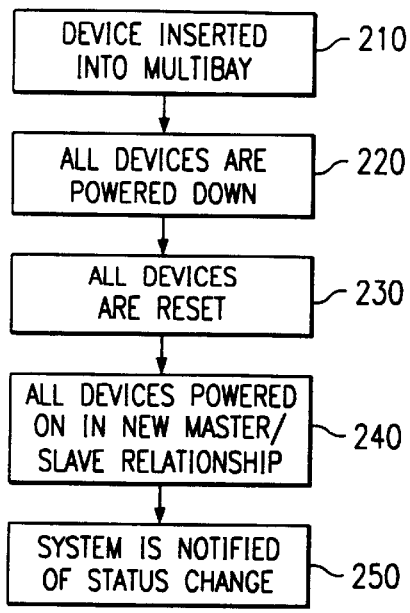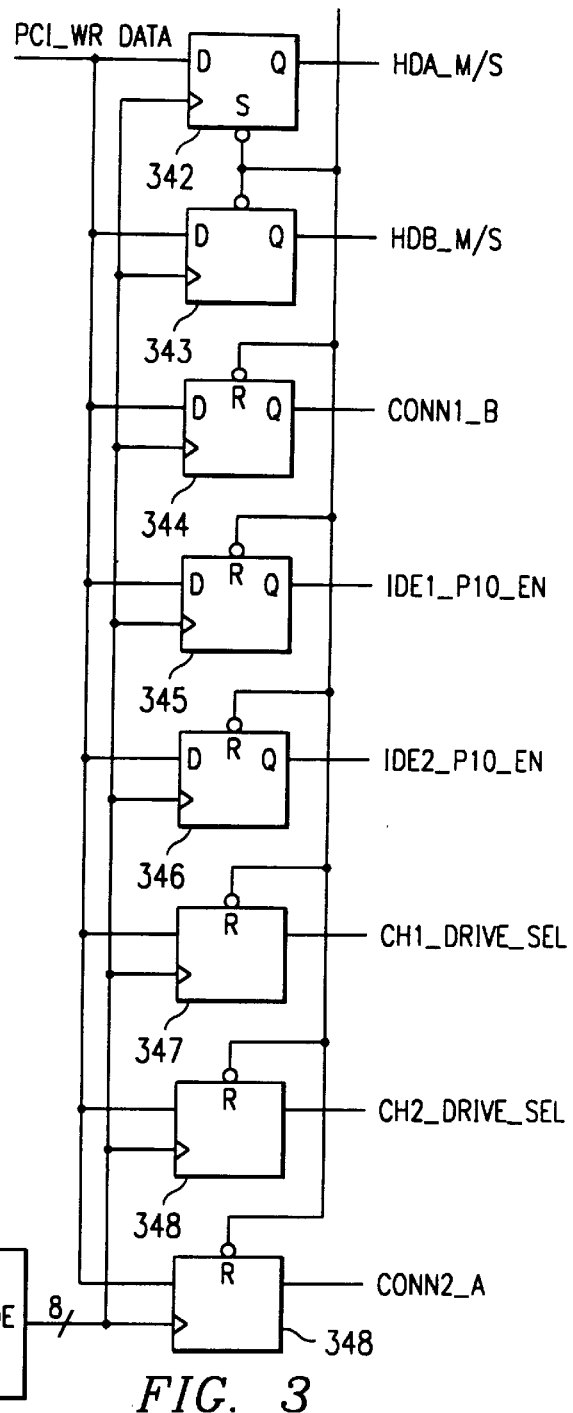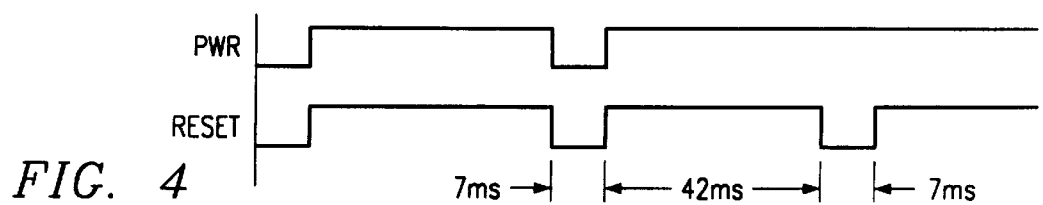

REAL-TIME HARDWARE MASTER/SLAVE RE-INITIALIZATION

BACKGROUND AND SUMMARY OF THE INVENTION

This application relates to reconfigurable computer systems, and more specifically to computer systems which can dynamically reconfigure peripheral configurations.
Innovative Peripheral Re-Initialization The preferred embodiment discloses a computer system in which various system peripherals are automatically re-initialized after being hot-swapped. The re-initialization includes accommodation of any required master/slave relationships between the peripherals.

For the default boot configuration, the hardware places the IDE controllers into Legacy Mode, and the IDE channel controller in the portable computer becomes the "Primary IDE channel". The device in the left bay (where the dedicated hard drive resides) becomes the master device on the Primary IDE channel, and the device in the right bay (the Multibay) becomes the slave device on the Primary IDE channel (if the device is present). If the system was docked when it booted, the IDE channel controller in the docking station becomes the "Secondary IDE channel". In this case, any device in the left Multibay in the docking station becomes the Slave device on the Secondary channel, while any device found in the right Multibay in the docking station becomes the Master device on the Secondary channel.

For the correct master/slave relationships to be established, all of the IDE devices must be powered down, restarted, and reset. As the devices come back on line, the individual IDE controllers on each device are able to see each other and thereby configure themselves in the probper master/slave configurations. This can be accomplished without shutting down, suspending, or otherwise interrupting the operation of the computer system.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1 shows a flowchart of the process of the presently preferred embodiment.

FIG. 3 shows a diagram of the IDE register settings according to the preferred embodiment.

FIG. 4 shows a timing diagram of the resent signals sent to the peripheral devices of the preferred embodiment.

DETAILED DESCRIPTION OF THE PREFERRED EMBODIMENTS

Preferred System Context

Figure 2:
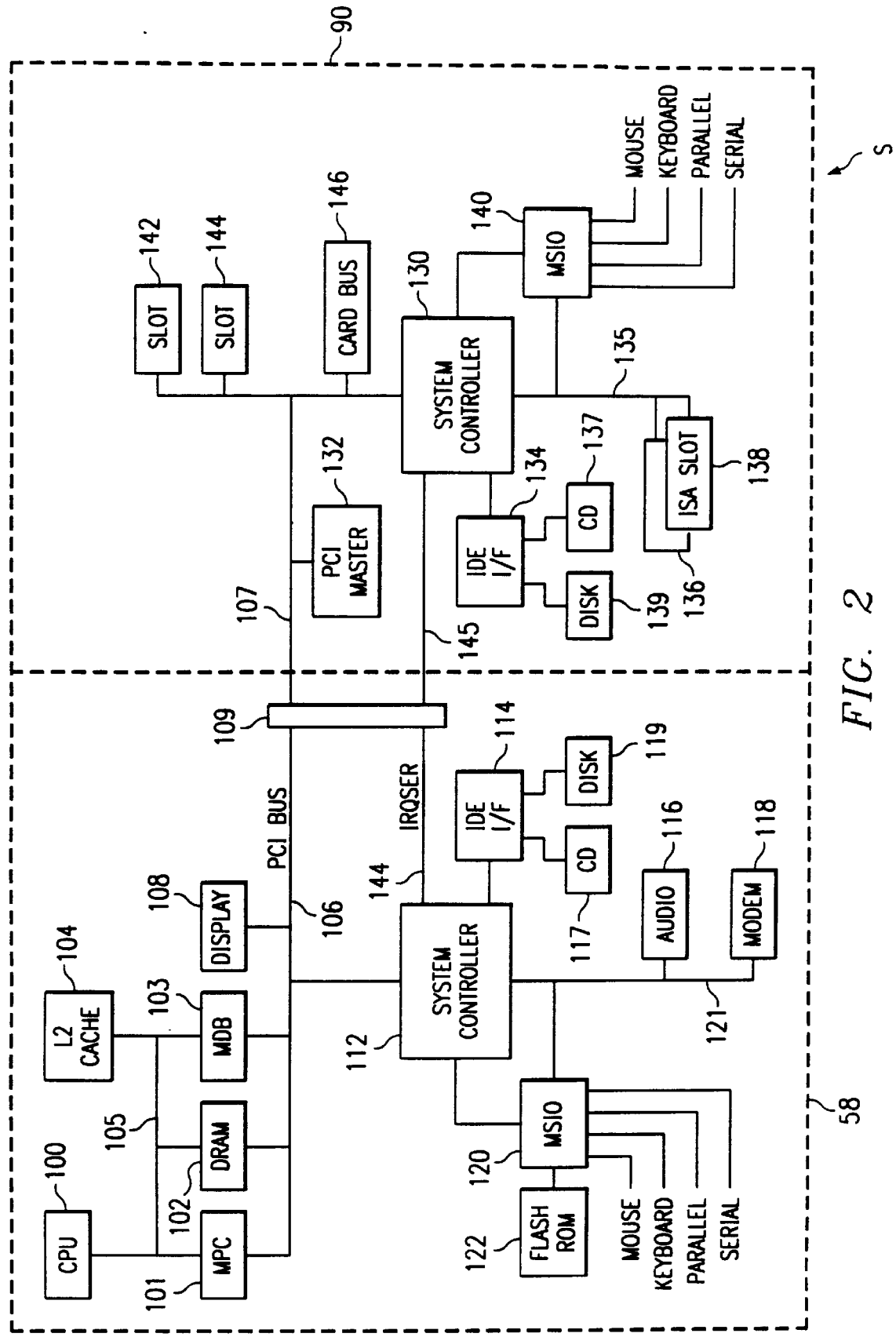
FIG. 2 shows a block diagram of a portable computer system according to the presently preferred embodiment.

In FIG. 2, a computer system S according to the presently preferred embodiment is shown. In FIG. 2, the system S includes a portable computer 80 and an expansion base unit 90. Within the portable computer 80, a CPU 100 and a level two (L2) cache 104 are connected to a high speed local bus 105. The processor 100 of the preferred embodiment is one of the 80X86 microprocessor family manufactured by Intel Corporation of Santa Clara, Calif. In the preferred embodiment, the processor operates with a standard IBM-PC compatible operating system, such as MS-DOS or Windows®, available from Microsoft Corporation of Redmond, Wash. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller (MPC) 101, a dynamic random access memory (DRAM) array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A display 108 is also connected to a PCI bus 106.

The PCI bus 106 is also connected to a system controller 112. The system controller 112 is a PCI to ISA bus bridge which also provides various support functions distributed between the portable computer 80 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio board 116 and a modem 118 as conventionally present in PC systems to provide sound and data communication capabilities for the system S via a first ISA interface 121. The IDE interface 114 of the system controller 112 drives one or more hard disk drives, preferably a CD-ROM player 117 and a disk drive 119. Further, the system controller 112 provides a single pin output to support a interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. Additionally, the MSIO 120 provides a parallel port, a serial port, a keyboard interface and a mouse interface, among others, for the computer system S.

A plurality of Quick Connect switches 109 are also connected to the PCI bus 106. Upon detecting a docking sequence between the portable computer 80 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low rds, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 80 is docked to the expansion base unit 90. The PCI bus 107 is also connected to PCI slots 142 and 144 and also to a card-bus interface 146 for accepting expansion cards. Also connected to the expansion PCI bus 107 is a second system controller 130, which is preferably a second integrated circuit of the same type as the system controller 112. The system controller 130 is connected to the expansion PCI bus 107 and the interrupt serial bus 145. The system controller 130 supports additional drives 137 and 139 through a second IDE interface 134. The system controller 130 also supports an ISA bus 135 which is connected to one or more ISA slots 136 and 138. The system controller 130 is further connected to a second MSIO device 140, which provides a secondary parallel port, serial port, keyboard interface and mouse interface.

Thus, the system S, upon docking, may have multiple parallel ports, serial ports, keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 80 when it is docked to the expansion base unit 90.

The plurality of IDE interfaces 114 and 134 on system controllers 112 and 130 provide the capability to expand the data storage capability of the system S. The IDE interfaces 114 and 134 require a mechanism for mapping drives configured in the master—master configuration into a master-slave configuration when the portable computer 80 is docked to the base expansion unit 90 for BIOS compatibility purposes and which remaps the drives back into a master-master mode after the separation of the portable computer 80 from the base expansion unit 90 to ensure optimal performance.

Default IDE Hardware Configuration on Boot

For the default boot configuration, the hardware places the IDE controllers into Legacy Mode, and the IDE channel controller in the portable computer becomes the "Primary IDE channel". The device in the left bay (where the dedicated hard drive resides) becomes the master device on the Primary IDE channel, and the device in the right bay (the Multibay) becomes the slave device on the Primary IDE channel (if the device is present). If the system was docked when it booted, the IDE channel controller in the docking station becomes the "Secondary IDE channel". In this case, any device in the left Multibay in the docking station becomes the Slave device on the Secondary channel, while any device found in the right Multibay in the docking station becomes the Master device on the Secondary channel. (Note that this is the opposite of the master/slave assignment in the portable computer). As shown in FIG. 3, the registers to store configuration data with respect to the master/slave designation of drives 117–119, the connection bits CONN1_B and CONN2_A, the PIO enable bits, and the channel select bits are disclosed. A plurality of flip-flops 341–348 store configuration data for physical drives A and B and for the primary and secondary channels. A reset signal RST* is connected to the set input of the flip-flop 342 and the reset inputs of the flip-flops 341–348. Thus, upon reset, a drive A master/slave signal HDA_M_S is set to a high indicating that drive A is the master, while a drive B master/slave signal HDB_M_S is cleared indicating that drive B is the slave. Additionally, a connection signal CONN1_B is cleared on reset to indicate that the drive B is not on the same channel as drive A. Similarly, a connection signal CONN2_A is cleared on reset to indicate that the drive A is not on the same channel as drive B. Further, programmed input/output enable signals IDE1_PIO_EN and IDE2_PIO_EN for enabling the respective drives to be in the programmed input/output (PIO) mode are cleared on reset. Additionally, shadowed channel select signals CH1_DRIVE_SEL and CH2_DRIVE_SEL for selecting channel one or channel two, are cleared during reset.

After reset, the flip-flops 341–348 can be configured using the PCI bus. Thus, the D inputs to flip-flops 341–348 are connected to eight PCI data lines of the PCI data bus which supplies the appropriate configuration values to the configuration registers. Further, the flip-flops 341–348 are individually clocked by the outputs of a decoder 349 which generates separate clocks for the flip-flops 342–348 when the PCI configuration cycle is performed and when these registers are selected via a write configuration signal WR_CONFIG, PCI address signals PCI_ADDR, PCI byte enable signals PCI_BE, and the PCI clock signal PCI_CLK.

Hardware Support for Floppy Drives

In the preferred embodiment, the floppy controller is located in the SMC Super I/O part, which is also called the MSIO. In a system consisting of a portable computer and docking station, there are two physical MSIOs: the MSIO in the portable computer is MSIO_L, while the MSIO in the docking station is MSIO_E. However, logically, there is only one floppy controller in this configuration, which can be used to control a maximum of two floppy drives. These two floppy drives can be located in any of the three Multibays.

Note that it is an illegal configuration, according to the preferred embodiment, to attempt to have three floppy drives in the system.

Hardware Support for Detection of Device Insertion or Removal in a Multibay

In the preferred embodiment, the hardware provides support for determining whether a device is present in a Multibay. This support is implemented using two drive detection pins on the MISC, HDA_PRESENT_ and HDB_PRESENT_. These pins are low (0) when a drive is present in the associated bay. The status of these two pins can be read from the power management register set of the MISC. To simplify detection of device insertion or removal in a Multibay, the MISC generates a System Management Interrupt (SMI) when a device is inserted or removed. Firmware is responsible for handling the SMI interrupt, as discussed below.

Event Notification Methods

The Plug and Play BIOS Specification (Version 1.0A), which is hereby incorporated by reference, defines two methods for the PnP BIOS to notify the PnP operating system of special events, such as docking, undocking, device insertion or device removal. Either of these two methods can be used:

Polled

Interrupt driven (asynchronous)

In the preferred embodiment, the BIOS uses the polled notification method to inform Windows 95® of system events.

When polled notification is used, the operating system periodically checks the Event Flag to see whether an event occurred; bit 0 of the Event Flag is set when a system event is pending. The physical address of the Event Flag is found in the BIOS Plug and Play Header Structure, in the field called the "Event Notification Address".

Device Insertion or Removal in the Portable Computer Multibay

The system process of the preferred embodiment is described below, and shown in the simplified flowchart of FIG. 1. When the user inserts or removes a device from the Multibay in the portable computer (step 210), an SMI interrupt is generated. The SMI interrupt handler in the BIOS gets control, and performs the following functions:

Puts the existing Multibay device (if any) to sleep (step 220)

Powers off the existing devices (this applies to both devices on the IDE channel if there is more than one device)

Resets the device(s) (step 230)

Powers up the devices in the new configuration (here, the BIOS takes care to power up devices configured as master/slave in such a way that the slave device is powered up before the master device, or at the same time as the master) (step 240)

Sets the bit in the Event Flag to notify Windows 95 that an event is pending (step 250)

The firmware knows only that a Multibay device has been inserted or removed; i.e., it does not know which device is now present, and it does not maintain any kind of record about what device was previously in the Multibay. The firmware's responsibility is simply to notify Windows 95 that the event occurred.

It has been found that at least some devices show an improved performance after receiving multiple reset signals (as opposed to a single reset signal) before being initialized. Therefore, in the preferred embodiment, whenever the Multibay devices are to be reset, instead of a single reset, a multiple reset is sent.

When a multiple reset is to be sent, after power is restored to the device, the system sends a series of low pulses on the device reset line, as shown in the timing diagram of FIG. 4. Each pulse is at least 7 ms long, and there is a 42 ms space between each pulse, during which the reset line is de-asserted. In the preferred embodiment, at least 2 reset pulses are sent each time a device is to be reset. The power to the device is dropped low at the same time as the first of the multiple resets. This multiple reset results in an increased performance by many peripherals.

Master/Slave Re-initialization for IDE Devices

The preferred provides means to re-initialize the devices found in the Multibays after a hot-swap, whether there are one or two devices present. By always re-initalizing both Device 0 and Device 1 (when present), the system always recognizes the appropriate master/slave relationship. In the preferred system, when a device is removed or inserted, the SMI interrupt is generated, as described above, and the devices are put to sleep. Both bays are then reset, and the new master/slave configuration is configured. The ATA specification defines the timing requirements for device reset, and ensures that any device configured as a master device (Device 0) samples for at least 450 ms for the DASP-signal to be asserted from any Device 1. This ensures that when the devices are reset, the master device is able to "see" the slave device.

In the case where the slave bay is empty or a floppy is there, just the master will be configured. Clearly, it is not necessary to configure a missing device, and a floppy drive (in the preferred embodiment) is not ATA-compliant.

In the case where the slave bay contains an ATA-compliant device, e.g. a CDROM drive, the new master/slave configuration will be configured as described above.

Further details of the system context, and of options for implementation, may be found in the books from MindShare, Inc., entitled PROTECTED MODE SOFTWARE ARCHITECTURE (1996), CARDBUS SYSTEM ARCHITECTURE (2.ed. 1996), EISA SYSTEM ARCHITECTURE (2.ed.), ISA SYSTEM ARCHITECTURE (3.ed.), 80486 SYSTEM ARCHITECTURE (3.ed.), PENTIUM PROCESSOR SYSTEM ARCHITECTURE (2.ed.), PCMCIA SYSTEM ARCHITECTURE (2.ed. 1995), PLUG AND PLAY SYSTEM ARCHITECTURE (1995), PCI SYSTEM ARCHITECTURE (3.ed. 1995), USB SYSTEM ARCHITECTURE (1997), and PENTIUM PRO PROCESSOR SYSTEM ARCHITECTURE (1.ed. 1997, 2.ed. 1997), all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

According to a disclosed class of innovative embodiments, there is provided a computer system, comprising: a user input device, a microprocessor which is operatively connected to detect inputs from said input device, random-access memory which is connected to be read/write accessible by said microprocessor, and an output device operatively connected to receive outputs from said microprocessor; a power supply connected to provide power to said microprocessor and said memory; and at least one bay configured to receive and electrically connect to a peripheral device; wherein when said device is inserted in said bay, said system is automatically configured to operate said device; wherein when said device is inserted in said bay, said device is automatically configured to operate with said system and any other said devices in another bay, and implements a master/slave relationship between said devices.

According to another disclosed class of innovative embodiments, there is provided a computer system, comprising: at least one input device and at least one output device; a main system module which does not include said input and output devices, and which includes therein: at least one microprocessor which is operatively connected to detect inputs from said input device and to send data to said output device, and random-access memory which is connected to be read/write accessible by said microprocessor; a bus connected to said main system module, and having connections through which additional modules can communicate with said main system module; and at least one peripheral device capable of being connected to and disconnected from said bus while said system is in operation; wherein when said peripheral device is connected to or disconnected from said bus, said system is reconfigures itself without further user intervention; and wherein if multiple said peripheral devices are connected to said bus, said system configures said devices to work with said system and with each other, according to a master/slave relationship between said devices.

According to another disclosed class of innovative embodiments, there is provided a portable computer system, comprising: a user input device, at least one microprocessor which is operatively connected to detect inputs from said input device, random-access memory which is connected to be read/write accessible by said microprocessor, and a display operatively connected to receive outputs from said microprocessor; power supply circuitry, including at least one electrochemical power source, connected to provide power to said microprocessor, said memory, and said output device; at least one bay configured to receive and electrically connect to a peripheral device; wherein when said device is inserted in said bay, said system is automatically configured to operate said peripheral device; wherein when said device is inserted in said bay, said device is automatically configured to operate with said system and any other said peripheral devices, according to a master/slave relationship between said devices.

According to another disclosed class of innovative embodiments, there is provided a portable computer system, comprising: a user input device, at least one microprocessor which is operatively connected to detect inputs from said input device, random-access memory which is connected to be read/write accessible by said microprocessor, and a display operatively connected to receive outputs from said microprocessor; power supply circuitry, including at least one electrochemical power source, connected to provide power to said microprocessor, said memory, and said output device; at least one Multibay configured to receive and electrically connect to a peripheral device; wherein when said device is inserted in said Multibay, said system is automatically configured to operate said peripheral device; wherein when said device is inserted in said Multibay, said device is automatically configured to operate with said system and any other said peripheral devices, according to a master/slave relationship between said devices.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

In other embodiments, similar techniques are used to support hot-swapping in the portable computer docking station. When the portable computer system is connected to the docking station, peripheral devices may be inserted or removed from the docking station (or otherwise connected or disconnected) as if they were being connected to the portable computer directly, as described above.

What is claimed is:

1. A computer system, comprising:

a user input device, a microprocessor which is operatively connected to detect inputs from said input device, random-access memory which is connected to be read/write accessible by said microprocessor, and an output device operatively connected to receive outputs from said microprocessor;

a power supply connected to provide power to said microprocessor and said memory; and at least one bay configured to receive and electrically connect to a peripheral device having an integral device controller;

wherein when said peripheral device is inserted in said bay, said system is automatically configured to operate said peripheral device;

wherein when said peripheral device is inserted in said bay, said peripheral device controller is automatically configured to operate with said system and any other said peripheral devices in another bay, and implements a master/slave relationship between said peripheral devices;

wherein whenever any said peripheral device is inserted into or removed from said system, all said peripheral devices are reset and reinitialized.

2. The system of claim 1, wherein said peripheral device conforms to the AT Attachment Interface specification.

3. The system of claim 1, further comprising a docking station connected to receive said system and at least one said peripheral device, and to pass electrical signals therebetween.

4. The system of claim 1, wherein if only one said peripheral device is present, said device acts as a device master.

5. The system of claim 1, wherein said peripheral devices may be inserted and removed from said system without stopping or suspending the operation of said system.

6. A computer system, comprising:

at least one input device and at least one output device;

a main system module which does not include said input and output devices, and which includes therein: at least one microprocessor which is operatively connected to detect inputs from said input device and to send data to said output device, and random-access memory which is connected to be read/write accessible by said microprocessor;

a bus connected to said main system module, and having connections through which additional modules can communicate with said main system module; and at least one peripheral device having an integral device controller, capable of being connected to and disconnected from said bus while said system is in operation;

wherein when said peripheral device is connected to or disconnected from said bus, said system reconfigures itself without further user intervention; and wherein if multiple said peripheral devices are connected to said bus, said system activates a reset in all said peripheral devices, so that said peripheral devices thereby acquire correct master/slave relationships;

wherein all peripherals are powered down then powered up when any said peripheral device is inserted or removed.

7. The system of claim 6, wherein said peripheral device conforms to the AT Attachment Interface specification.

8. The system of claim 6, further comprising a docking station connected to receive said system and at least one said peripheral device, and to pass electrical signals therebetween.

9. The system of claim 6, wherein if only one said peripheral device is present, said peripheral device acts as a device master.

10. The system of claim 6, wherein said peripheral devices may be inserted and removed from said system without stopping or suspending there operation of said system.

11. The system of claim 6, wherein whenever any said peripheral device is inserted into or removed from said system, all said peripheral devices are reset and reinitialized.

12. The system of claim 6, wherein said correct master/slave relationships are acquired regardless of which bay contains a master device.

13. A portable computer system, comprising:

a user input device, at least one microprocessor which is operatively connected to detect inputs from said input device, random-access memory which is connected to be read/write accessible by said microprocessor, and an output device operatively connected to receive outputs from said microprocessor;

power supply circuitry, including at least one electrochemical power source, connected to provide power to said microprocessor, said memory, and said output device;

multiple bays each configured to receive and electrically connect to a peripheral device having an integral device controller;

wherein when said peripheral device is inserted in said bay, said system is automatically configured to operate said peripheral device;

wherein when said peripheral device is inserted in any one of said bays, all said peripheral devices are automatically configured to operate with said system and any other said peripheral devices, according to a master/slave relationship between said peripheral devices;

wherein whenever any said peripheral device is inserted into or removed from said system, all said peripheral devices are reset and reinitialized.

14. The system of claim 13, wherein said peripheral device conforms to the AT Attachment Interface specification.

15. The system of claim 13, further comprising a docking station connected to receive said system and at least one said peripheral device, and to pass electrical signals therebetween.

16. The system of claim 13, wherein if only one said peripheral device is present, said peripheral device acts as a device master.

17. The system of claim 13, wherein said peripheral devices may be inserted and removed from said system without stopping or suspending the operation of said system.

18. A portable computer system, comprising:

a user input device, at least one microprocessor which is operatively connected to detect inputs from said input device, random-access memory which is connected to be read/write accessible by said microprocessor, and an output device operatively connected to receive outputs from said microprocessor;

power supply circuitry, including at least one electrochemical power source, connected to provide power to said microprocessor, said memory, and said output device;

at least one multiple-function bay configured to receive and electrically connect to a peripheral device;

wherein when said peripheral device is inserted in said bay, said system is automatically configured to operate said peripheral device;

wherein when said peripheral device is inserted in said bay, said system activates a reset in all said peripheral devices, so that said peripheral devices thereby acquire correct master/slave relationships;

wherein whenever any said peripheral device is inserted into or removed from said system all said peripheral devices are reset and reinitialized.

19. The system of claim 18, wherein said peripheral device conforms to the AT Attachment Interface specification.

20. The system of claim 18, further comprising a docking station connected to receive said system and at least one said peripheral device, and to pass electrical signals therebetween.

21. The system of claim 18, wherein if only one said peripheral device is present, said peripheral device acts as a device master.

22. The system of claim 18, wherein said peripheral devices may be inserted and removed from said system without stopping or suspending the operation of said system.

* * * * *